United States Patent [19]
Hammet

[11] Patent Number: 4,972,591
[45] Date of Patent: Nov. 27, 1990

[54] METHOD AND DEVICE FOR LAND SURVEYING

[76] Inventor: E. Scott Hammet, P.O. Box 22245, Hilton Head Is., S.C. 29925

[21] Appl. No.: 496,362

[22] Filed: Mar. 20, 1990

[51] Int. Cl.⁵ ............................................. G01C 15/02
[52] U.S. Cl. ..................................................... 33/293
[58] Field of Search ......................... 33/293, 228, 290; 52/103, 104, 105; 116/209

[56] References Cited

U.S. PATENT DOCUMENTS 564,025   7/1896   Northam ................................ 53/103

FOREIGN PATENT DOCUMENTS 0051913   5/1982   European Pat. Off. ............... 33/293
0013311   1/1982   Japan ..................................... 33/293

Primary Examiner—Harry N. Haroian
Attorney, Agent, or Firm—Michael A. Mann

[57] ABSTRACT

A hub for land surveying with an electronic distance measurement (EDM) instrument and a prism pole, the hub having a taper at one end and, at the other end, a surface marked with a series of parallel lines 0.01 feet apart. When the hub is driven into the ground at the approximate location of a second traverse point and one final measurement is taken from the top of the hub, the holder of the prism pole can quickly and easily obtain the exact location of the second traverse point with no additional measurements being taken. The hub may have a second set of lines at a 90 degree angle with respect to the first to help the prism rod holder locate the true traverse line, distinguish each line in the first series of lines, and determine the center of the hub. The hub may also have markings on the side of the hub serving as a specialized ruler to assist the prism rod holder in locating the approximate second traverse point before he drives the hub into the ground.

16 Claims, 1 Drawing Sheet

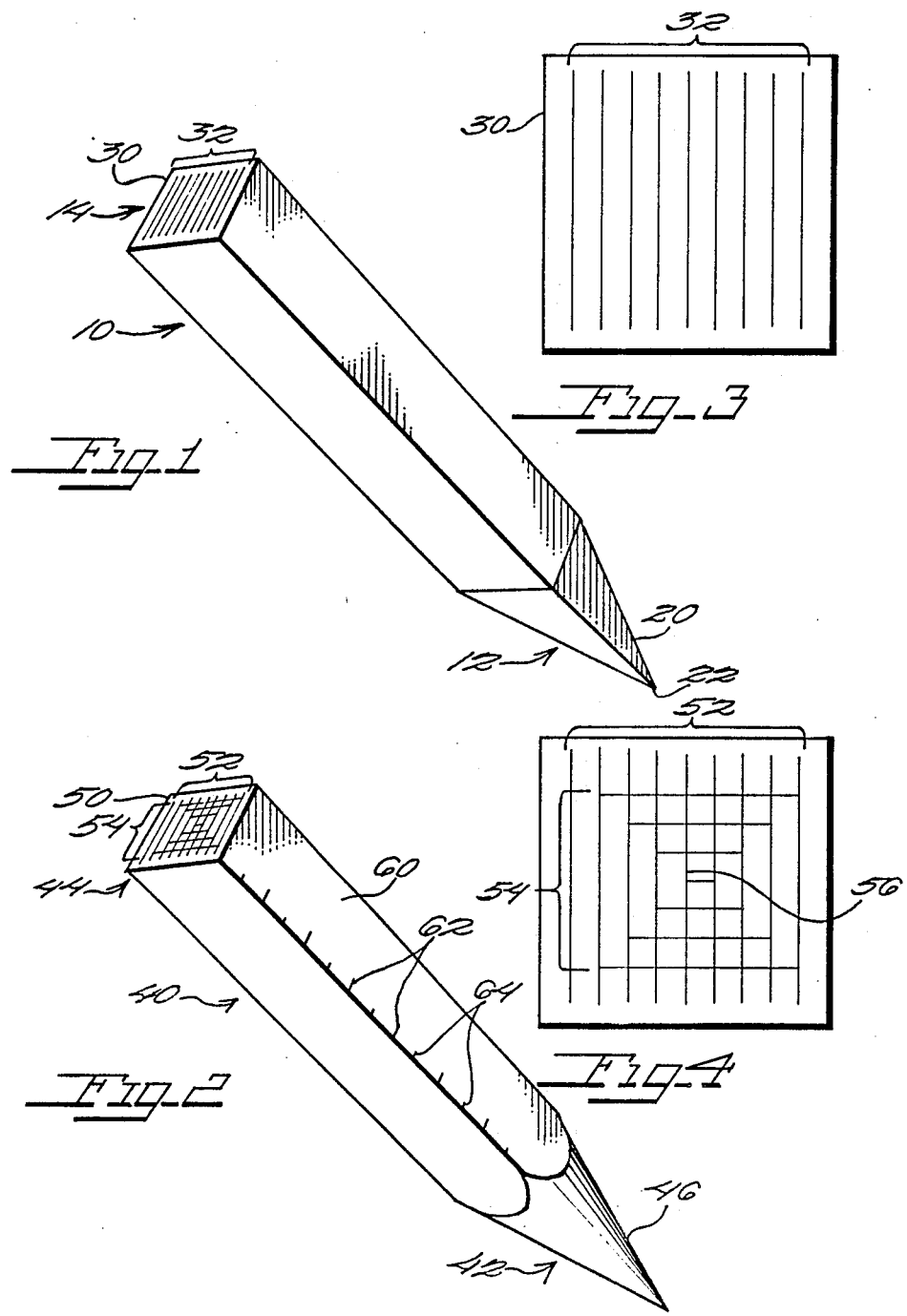

METHOD AND DEVICE FOR LAND SURVEYING

BACKGROUND OF THE INVENTION

1. Field of the Invention;

The present invention relates to surveying methods and devices. In particular, the present invention relates to surveying hubs for locating a traverse point and a method for use thereof.

2. Discussion of Background:

The art of surveying is thousands of years old, as old as ownership and taxation of real property which began as early as 1400 BC in Egypt. Early Egyptian surveyors used ropes for distance measurements and plumb bobs, leveling frames, and channels filled with water to determine if a foundation were level. Roman surveyors developed the use of the odometer and a device called a groma, comprising two horizontal crossarms fastened at right angles with plumb bobs attached to the ends of the crossarms, for laying off right angles. The surveyor's chain was developed in the early 1600 and is in use today. Although there have been great improvements in materials used for chains and tapes. Steel is still the most common material for a chain but fiberglass and special alloys such as INVAR and woven tapes provide better performance and less structural variation as a result of thermal expansion and elastic stretching.

Recently the number of improvements in the equipment used for measuring distance has increased dramatically. Distance is now frequently measured with electronic distance measurement (EDM) instruments that rely on the time for a beam of sound or light rays (including visible, infrared, laser, radar and microwave) to travel to a reflector and back. The beam of sound or light rays emitted by the EDM instrument positioned at a first location are reflected back by a prism, usually mounted on a pole, positioned at a second location to determine the distance between the two locations. The accuracy and ease of use of these instruments have been improved and their size and cost reduced to the point where they are essential in modern land surveying.

Technological advances have also been made in optical equipment and leveling devices used inland surveying. Minicomputers are built into many of these devices to perform the calculations related to land surveying in an attempt to improve calculational accuracy in the field.

Typically land surveying is performed as follows. When measuring distances greater than 35 feet, an instrument operator sets up an EDM instrument on a tripod over a known point at a first location, sometimes called a traverse station or traverse point. A second member of a survey crew, the "rod man", handles the prism pole. The rod man will pace off a distance along a line from the first traverse point to a second location to locate approximately the position of the second traverse point. The EDM instrument operator also instructs the rod man to move the prism to the left or right in order to establish the correct, pre-determined traverse line. No numerical increments are communicated in this left/right movement.

An experienced rod man can pace off a distance of 200 feet and usually be within 5 to 10 feet of the true distance. The rod man, then, turns his prism to face the EDM instrument operator who in turn places him on line and electronically measures, or "shoots", that distance. The EDM operator then communicates orally or by radio to the rod man to move the prism forward or backward some specific distance to achieve the exact total distance required to establish the second traverse point. The rod man estimates this communicated distance and repositions the prism pole, so the EDM instrument operator can take another "shot." This process is repeated until the prism is within approximately 0.05 feet of the desired second traverse point. On this point a hub, which is a wooden stake approximately 1½inches by 1½inches by 12 inches or less, is driven into the ground so that its upper surface is flush with the surface of the ground. A plumb bob is held over the stake by the rod man and sighted on by the instrument operator. When the plumb bob is aligned with the traverse line, a temporary mark is made in the hub's top surface. Next, the prism rod is placed on the temporary mark, and the EDM process continues until the exact distance (measured in hundredths of a foot) is located. A tack is placed in the surface of the hub to mark this location permanently.

For the rod man to arrive at this exact point, the EDM instrument operator may have to take a number of measurement readings, often four or more. The number of readings, or "shots", that are necessary depends on how adept the rod man is at judging distances. A rod man is usually paid a low wage, and turnover in employment is high. Consequently, instrument operators are constantly faced with new, unskilled rod men. Location of an exact point can therefore be time-consuming and frustrating for both crew members.

There are a number of hubs designed to carry or contain information about the survey. See for example U.S. Pat. Nos. 4,127,972 issued to Reimoser, 546,025 issued to Northam, and 191,919 issued to Bonner. However, there is none that helps to locate a point.

Only recently has EDM technology made the measuring of distances in land surveying possible without a chain; therefore, not until recently has there been a need for an improved hub, designed to compliment and assist EDM instrument use in land surveying.

There is a need for accuracy and speed in every aspect of land surveying. When tapes and chains were the principle means of measuring distances, the chain could be placed over the hub while being stretched between traverse points, so the point where the second traverse point lay was automatically located. Now, as surveyors have moved to the use of EDM instruments, the method of locating the second point has taken on a somewhat intangible characteristic. However, the design of the hub has not evolved with the rest of land surveying technology.

SUMMARY OF THE INVENTION

According to its major aspects, the present invention is a hub for use in land surveying comprising an elongate member tapered to a point at one end for penetrating the ground and having a surface at the opposing end on which is impressed a series of lines, preferably parallel, equidistant lines for facilitating the positioning of a marker thereon. The surface may have a second set of lines, preferably perpendicular to the first and of varying lengths, for making the equidistant series of lines more distinguishable. Additionally, markings at regular intervals may be placed conveniently along one side of the hub. These markings are used in reducing the distance error in locating the second traverse point from plus or minus one foot to plus or minus 0.05 feet before driving the hub into the ground.

A feature of the present invention is the series of equidistant lines, preferably precise 0.01 foot increments, on the top surface of the hub. This feature can eliminate the need and time required for additional measurements by the EDM operator.

The second series of markings at right angles with respect to the first set and preferably of varying lengths to facilitate establishing the traverse line and distinguishing each of the lines of the first set from each other is another feature of the present invention. The advantage of this feature is that it enhances visual clarity, thus reducing the likelihood of miscounting the lines used in measuring distance. The second set can also be helpful in establishing the traverse line on the top surface of the hub, should that line not fall directly across the center of the hub.

It is another feature of the present invention that one end of the hub has a conical taper. The advantage of the conical taPer is that the hub can be tapered in one step as opposed to the method for making existing hubs, made by a series of angled cuts interspersed with a series of partial rotations of the hub. Also, the conical taper reduces the likelihood of the hub angling off from the intended center point as it is driven into the ground.

Yet another feature of the present invention is the addition of markings at regular intervals on one side to facilitate location of the second traverse point prior to driving the hub into the ground. This feature allows the rod man to reduce the error in locating the second traverse point from about one foot to 0.05 feet without the need for additional EDM measurements.

BRIEF DESCRIPTION OF THE DRAWINGS

In the drawings:

FIG. 1 is a perspective view of a stake according to an embodiment of the present invention;

FIG. 2 is a perspective view of a stake according to another embodiment of the present invention;

FIG. 3 is a top plan view of the stake of FIG. 1; and

FIG. 4 is a top plan view of the stake of FIG. 2.

DETAILED DESCRIPTION OF A PREFERRED EMBODIMENT

Referring now to FIG. 1, the invention is a device for use in land surveying comprising an elongate member or hub generally indicated by the reference numeral 10 and having a first end 12 and a second end 14. Hub 10 may have a square, rectangular or round cross section and made of any reasonably rigid material that may be driven into the ground by a mallet or hammer but is conveniently made of a length of pine having approximately 1½inch by 1½inch cross section.

First end 12 is shown having a pyramidal taper at 20, preferably to a point at 22, for ease in driving it into the ground. Second end 14 has a surface at 30, preferably flat. On surface 30 are a series of lines 32 which facilitate fast and accurate traverse point location as will be described below, toward or away from the instrument along the traverse line. Series of lines 32, as shown in FIG. 3, are preferably equidistant and most preferably 0.01 feet apart, since most land surveying measurements are done in the U.S. in units of feet, but may be in metric units and separated by 0.25 centimeters, as convenient. Series of lines 32 may be concentric or parallel, and, if parallel, may be oriented parallel to a side of hub 10, as shown in FIG. 3, or at a 45 degree angle from a side of hub 10.

FIG. 2 shows an alternative embodiment of the present invention in a hub 40 having a first end 42 and a second end 44. First end has a taper at 46 but rather than the pyramidal taper of first end 12 of hub 10, first end 42 of hub 40 is conically tapered. A conical taper could be made with a cutting tool in one step.

At second end 44 of hub 40 is a surface 50 having a first series of lines 52 thereon. First series of lines 52, as shown in FIG. 2 are equidistant and parallel and also have a second series of lines 54 oriented at an angle with respect to first series of lines 52 here shown parallel to first series of lines 52. Second series of lines 54 facilitate distinguishing each line of first series of lines 52 from the other. Second series of lines 54, as shown in FIG. 4, have different lengths and in particular each line of the second series farther away from the center 56 of surface 50 is longer than the previous one. Although other means for distinguishing each line in first series of lines 52 are possible (such as colors), this arrangement also helps to indicate center 56 of surface 50. Importantly, when hub 40 is driven into the ground the true traverse line might not still the centered on surface 50. Second series of lines 54 can be used as a visual aid in sighting the traverse line if it falls a few hundredths to the left or right of center 56 based on instructions by the EDM operator.

Along side 60 of hub 40 are a series of equidistant marks 62, preferably every 0.1 foot with 0.05-foot increments 64 also marked. These markings serve as a specialized ruler to facilitate identifying where hub 40 should be driven into the ground once the second traverse point has been located to within plus or minus one foot.

First and second series of lines 52 and 54 and marks 62, 64 can be printed on hub 40 but are preferably impressed into surface 50 and side 60, respectively, by branding, stamping or some other means that enables them to resist wear.

In using the present invention, an EDM instrument is set up on a tripod over a traverse point and leveled. A distance is paced off along the desired traverse line. At roughly the approximate location of the second point, a prism mounted on a prism polished upright by the rod man and the distance to the prism pole is measured by the EDM operator. At this point, hub 40 is placed on the ground adjacent to and generally parallel to the traverse line with markings 62 of hub 40 upward. The operator of the instrument directs the rod man to the exact second traverse point using increments of hundredths of a foot toward or away from the first traverse PoInt. Using markings 62,64 as guides, the rod man drives hub 40 into the ground within a few hundredths of the location of the second traverse point with first series of lines 52 perpendicular to the traverse line.

A plumb bob is suspended over hub 40 and moved side to side, perpendicular to traverse line, until it is centered on the traverse line. A small indentation is made with the point of the plumb bob in the top of hub 40.

Then, using prism pole placed on hub 40 where the indentation was made, the EDM operator sights on the prism and instructs the holder of the prism pole as to the exact location of the second traverse point as it relates to the prism pole's position. These instructions are given in terms of hundredths of a foot toward or away from the Prism pole and correspond to the numbers of lines in first series of lines 52. For example, an instruction of "towards four hundredths" results in a survey tack being placed in the surface 50 of the hub 40 on the fourth line of the first series of lines 52 from the prism pole's position toward the EDM instrument operator. In so doing the location of the second traverse point is complete.

It will be apparent to those skilled in the art from a reading of the foregoing description that several modifications can be made in the particular embodiments described herein which do not depart from the spirit and scope of the invention, which is to be defined by the appended claims.

What is claimed is:

1. A device for use with an electronic distance measurement instrument in land surveying, said device comprising an elongate member having means for penetrating the ground at a first end and a surface at an opposing, second end, said surface having a plurality of equidistant lines impressed into said surface as a guide in marking the location of a traverse point on said surface in response to incremental distance movement directions from the operator of said electronic distance measurement instrument.

2. The device as recited in claim 1 wherein said series of lines further comprises a series of parallel, equidistant lines.

3. The device as recited in claim 2, wherein said series of parallel, equidistant lines are spaced apart by 0.01 feet.

4. The device as recited in claim 3, wherein said penetrating means further comprises a tapered first end.

5. The device as recited in claim 4, wherein said tapered first end is conically tapered.

6. The device as recited in claim 2, wherein said surface further comprises means for distinguishing each line of said series of parallel, equidistant lines.

7. The device as recited in claim 6, wherein said distinguishing means further comprises a second set of parallel lines, at an angle with respect to said series of parallel, equidistant lines, each line of said second set having a different length.

8. The device as recited in claim 7, wherein said series of parallel, equidistant lines are spaced apart by 0.01 feet.

9. The device as recited in claim 8, wherein said series of parallel, equidistant lines are impressed into said surface.

10. The device as recited in claim 9, wherein said penetrating means is a tapering of said first end.

11. The device as recited in claim 10, wherein said tapering is conical.

12. A method for land surveying comprising the steps of;

locating the approximate position of a second point along a line at a distance from a first point using an electronic distance measuring means for determining distance from said first point;

driving into the ground at said second point a hub having a first, tapering end and an opposing, second end having a surface with a series of parallel, equidistant lines marked thereon, said hub oriented so that said series of parallel lines is perpendicular to said line from said first point;

making a temporary mark on said surface of said second end of said hub where said line passes thereacross; and making a final mark on said surface toward or away from said temporary mark a number of lines corresponding to a distance increment instruction determined from said electronic distance measuring means.

13. The method as recited in claim 12, wherein each of said series of parallel, equidistant lines is spaced 0.01 feet apart.

14. The method as recited in claim 12, wherein said hub has a series of equidistant markings on one side and said method further comprises the steps of:

laying said hub generally parallel to said line from said first point within approximately one foot of said second point; and using said markings on said side of said hub for locating said approximate position of said second point to within a few hundredths of a foot.

15. The method as recited in claim 13, wherein said hub has a series of equidistant markings on one side and said method further comprises the steps of:

laying said hub generally parallel to said line from said first point within approximately one foot of said second point; and using said markings on said side of said hub for locating said approximate position of said second point to within a few hundredths of a foot.

16. A device for use with an electronic distance measurement instrument in land surveying, said device comprising an elongate member having means for penetrating the ground at a first end and a surface at an opposing, second end, said surface having a series of parallel, equidistant lines carried by said surface as a guide in marking the location of a traverse point on said surface in response to incremental distance movement directions from the operator of said electronic distance measurement instrument, said surface having a second set of parallel lines, at an angle with respect to series of parallel, equidistant lines, each line of said second set having a different length.

* * * * *